(12) United States Patent
Elliott

(10) Patent No.: US 10,955,566 B1
(45) Date of Patent: Mar. 23, 2021

(54) PSP MOSAIC BUILDER

(71) Applicant: Michael Elliott, Albuquerque, NM (US)

(72) Inventor: Michael Elliott, Albuquerque, NM (US)

(73) Assignee: Michael Elliott, Albuquerque, NM (US)

( * ) Notice: Subject to any disclaimer, the term of this patent is extended or adjusted under 35 U.S.C. 154(b) by 0 days.

(21) Appl. No.: 16/745,310

(22) Filed: Jan. 16, 2020

(51) Int. Cl.
*G01T 1/20* (2006.01)

(52) U.S. Cl.
CPC ........................... *G01T 1/20* (2013.01)

(58) Field of Classification Search
CPC ........................................................ G01T 1/20
See application file for complete search history.

(56) References Cited

U.S. PATENT DOCUMENTS 10,631,813 B1 * 4/2020 Huang .................. A61B 6/587

* cited by examiner

*Primary Examiner* — Kiho Kim

(57) ABSTRACT

This invention provides an ornate method and design to create a PSP panel assembly mosaic for radiography operations. There is no similar design or method as taught herein. Having an integrated attachment point allows a superior foundation to secure PSP panel assemblies together with unique brackets allowing for modular attachments, improving performance, and capabilities. All current options utilize external methods that are not dependable, bulky, and are not modular. The main benefits of this method are a more secure connection, better image quality, fewer backscatter deposits, lightweight, ease of use, and smaller boxes needed to carry components.

4 Claims, 6 Drawing Sheets

PSP MOSAIC BUILDER

TECHNICAL FIELD

The present invention relates to radiography and a method of allowing Photostimulable Phosphor (PSP) plate assemblies to be joined, creating larger X-ray images referred to as mosaics.

BACKGROUND

When taking large X-rays of an item, PSP plates are often used and joined together to create one large image. The most common method to secure them together is by attaching suction cups on the back of a polycarbonate (PC) plate which is behind the PSP plate. There are two main methods that the PSP panel assemblies are held in place, preventing the phosphor side from receiving light emissions that degrade and erases the image. The first method is using a plastic-like cassette that allows a piece of steel or lead to be inserted, acting as an intensifier with photon interaction, followed by the PSP plate and finally the PC plate, which gives structure and a surface to attach suction cups. The second method is securing a sheet magnet to the PC plate, with the PSP plate being held in place by the steel front, securing it to the magnet preventing it from moving. In both scenarios, the way to connect multiple panels is by using suction cups. The back of the PC is a rigid flat surface allowing the suction cups to secure multiple panels together creating a mosaic. The issue is that suction cups fail, and imperfections in the PC increase the chance that the built mosaic will fall apart. Typically, when building large mosaics, multiple suction cups will fail and occasionally, panels will fall. Given a scenario where this large mosaic is placed behind a suspect package, having a panel fall could be life or death.

While building mosaics over and over and struggling, I knew that there had to be a better way, and there is. I started modeling in my spare time first starting with switch magnets used in welding and quickly realized that trying to create a device to replace the suction cups either weighed way more, took up more space, or was utterly impractical. Then I realized that if I stopped trying to replace the suction cups or a way to hold on to the existing PC and focused on modifying the PC, I could use lightweight connectors giving a secure method. Upon doing further research and 3D modeling the design, I found that by drilling holes and melting in threaded adapters, I could create attachment points integrated to the PC allowing for custom brackets to bridge between panels secured by bolts. This method is unique, as well as the idea to modify the PC or substitute material to include integrated attachment points. The main benefits of this method are a more secure connection, better image quality, fewer backscatter deposits, lightweight, ease of use, and smaller boxes needed to carry everything.

SUMMARY OF THE INVENTION

The invention provides a unique PSP Mosaic Builder method, which creates integrated attachment points for PSP panel assemblies to be joined, creating a larger imaging surface, surpassing all current methods known.

Optionally, the PSP Mosaic Builder utilizes at least one integrated attachment point in the PC or substitute backing material. Feature 1

Optionally, the PSP Mosaic Builder utilizes melt-in threaded adapters. Feature 2

Optionally, the PSP Mosaic Builder utilizes additional forms of threaded adapters as attachment points. Feature 3

Optionally, the PSP Mosaic Builder utilizes a steel intensifier. Feature 4

Optionally, the PSP Mosaic Builder utilizes a magnet attached to the PC or substitute backing material. Feature 5

Optionally, the PSP Mosaic Builder utilizes an ergonomic disassembly access hole to make separating the PSP plate more natural and faster. Feature 6

Optionally, the PSP Mosaic Builder utilizes other methods of creating an integrated attachment point on the ridged PC or substitute material. Feature 7

Optionally, the PSP Mosaic Builder utilizes small brackets to connect attachment points on separate panels using the integrated attachment points. Feature 8

Optionally, the PSP Mosaic Builder utilizes larger brackets to connect multiple panels using the integrated attachment points. Feature 9

Optionally, the PSP Mosaic Builder utilizes ergonomic attachments that use the integrated attachment points. Feature 10

Optionally, the PSP Mosaic Builder utilizes PC as the preferred backing material but may comprise of other materials, i.e. plastics, rubbers, metals, acrylics. Feature 11

Optionally, the PSP Mosaic Builder utilizes a version without a magnet. Feature 12

Optionally, the PSP Mosaic Builder utilizes a version without the front intensifier being steel, or without the presence of an intensifier.

Optionally, the PSP Mosaic Builder will be made using water jet cutting or milling.

DETAILED DESCRIPTION OF THE INVENTION

Overview

The presented invention contemplates methods and devices in building a PSP panel mosaic, which allows for enhanced performance and image quality. Devices of the invention can have various features taught herein. A preferred embodiment of the invention comprises one central method taught, utilizing integrated attachment points. This preferred embodiment allows a PSP panel assembly to connect to another PSP panel assembly with a uniquely secure connection. Currently, all other methods utilize external attachment methods, i.e., suction cups or huge contraptions, to slide the assemblies together. These integrated attachment points also allow for additional ergonomic attachments increasing the usability.

FIG. 1

Figure 1:
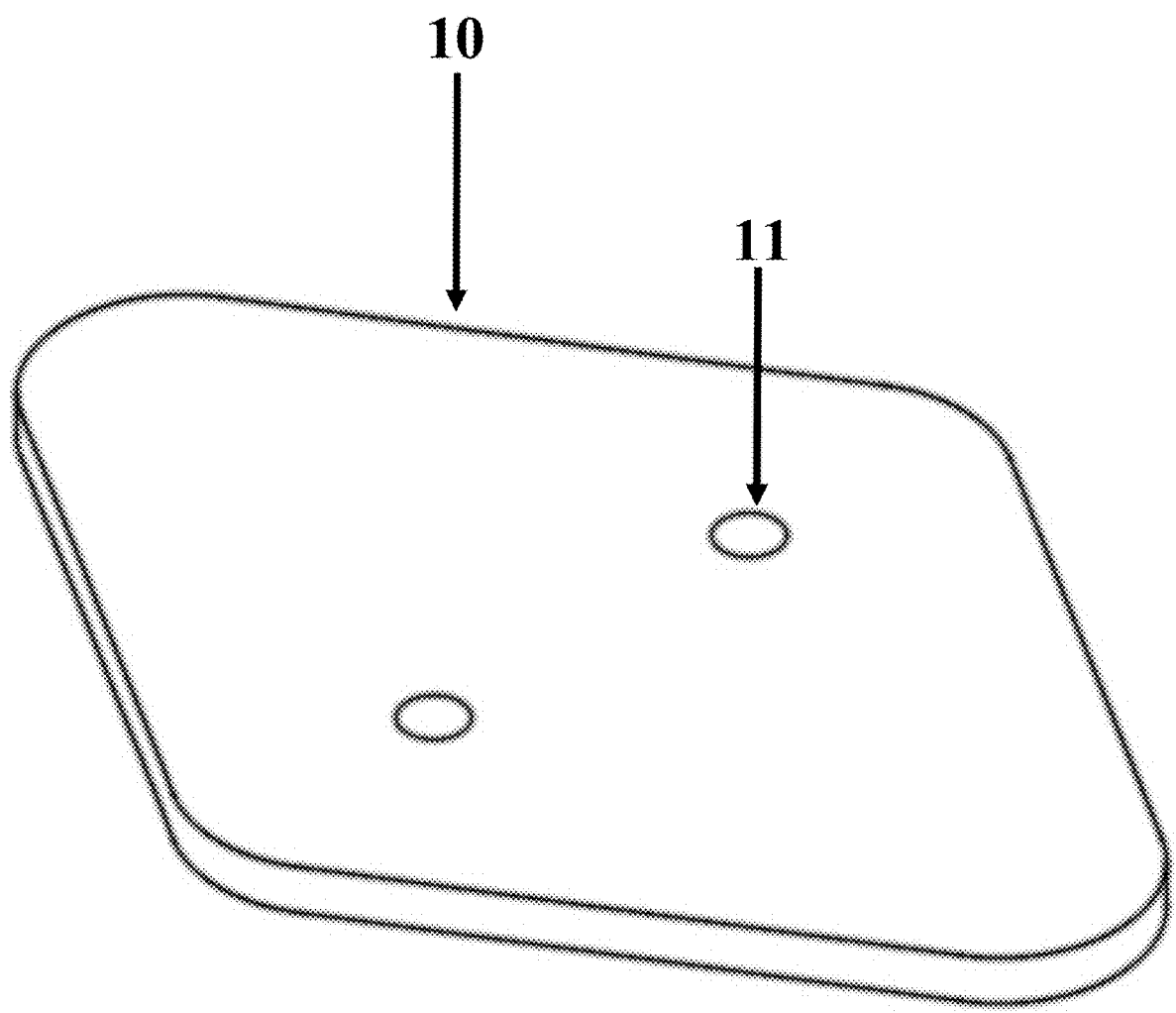
FIG. 1 depicts a preferred embodiment of a small bracket of the invention.

FIG. 1 depicts a preferred embodiment of a small bracket of the invention. The small bracket 10 is preferably aluminum and has holes that align with the integrated attachment points shown on FIG. 3. This bracket is a simple design for having fewer attachment points, making the mosaic assembly faster. The bracket can be modified to other forms as depicted in FIG. 2, FIGS. 5 20, 51 and 52.

Figure 3:
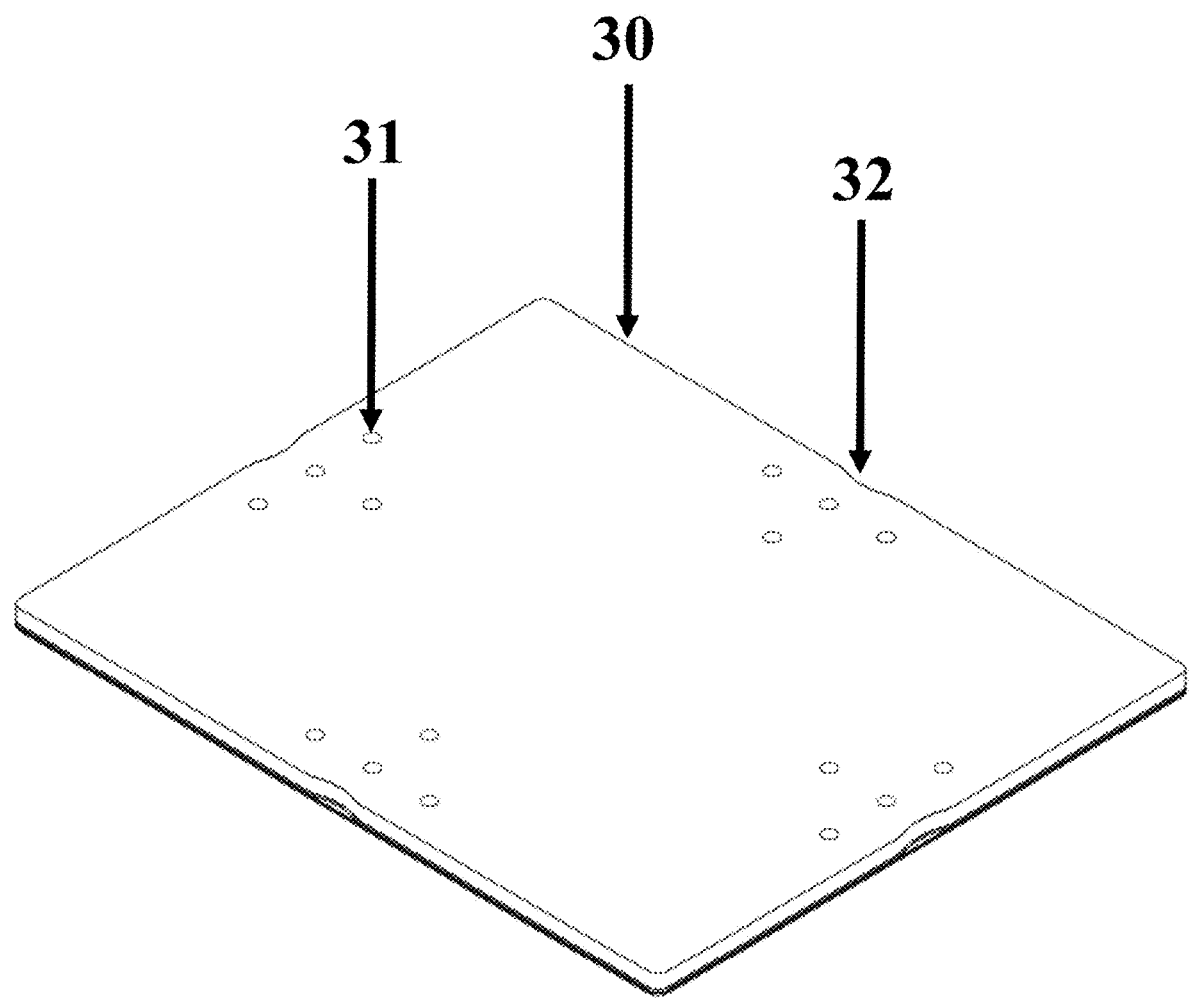
FIG. 3 depicts a preferred embodiment of a PSP panel assembly of the invention.

Part Number 11 depicts a hole in the small bracket designed to align with the integrated holes depicted on FIG. 3. The hole size shown is about 0.25 inches for a bolt to pass through, allowing a tight, secure connection to the melt-in threaded adapter depicted in FIG. 6. The hole size may be larger or smaller based on the materials and overall design parameters of the integrated attachment points.

The citations provided herein are hereby incorporated by reference for the cited subject matter.

FIG. 2

Figure 2:
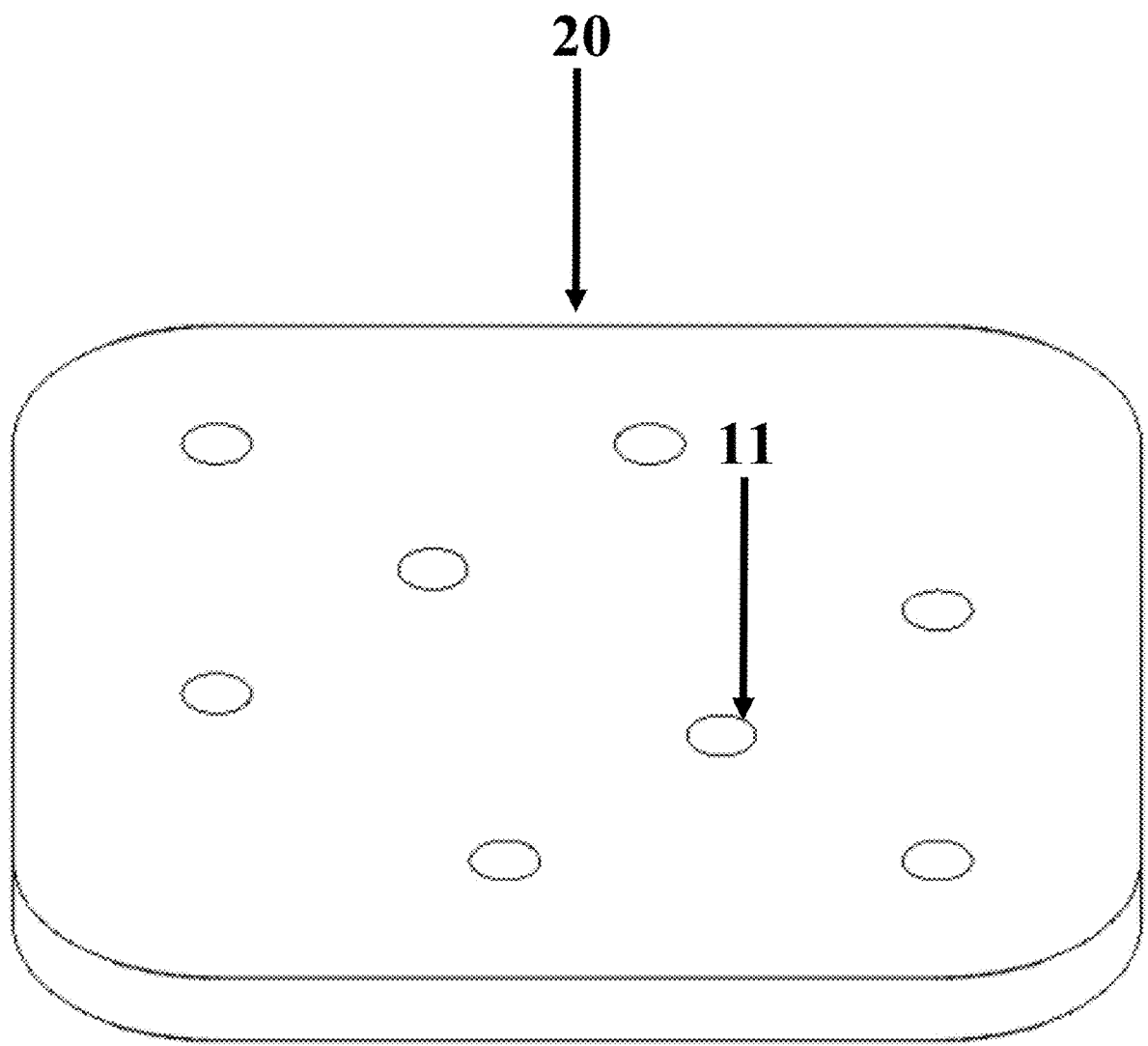
FIG. 2 depicts a preferred embodiment of a large bracket of the invention.
Figure 5:
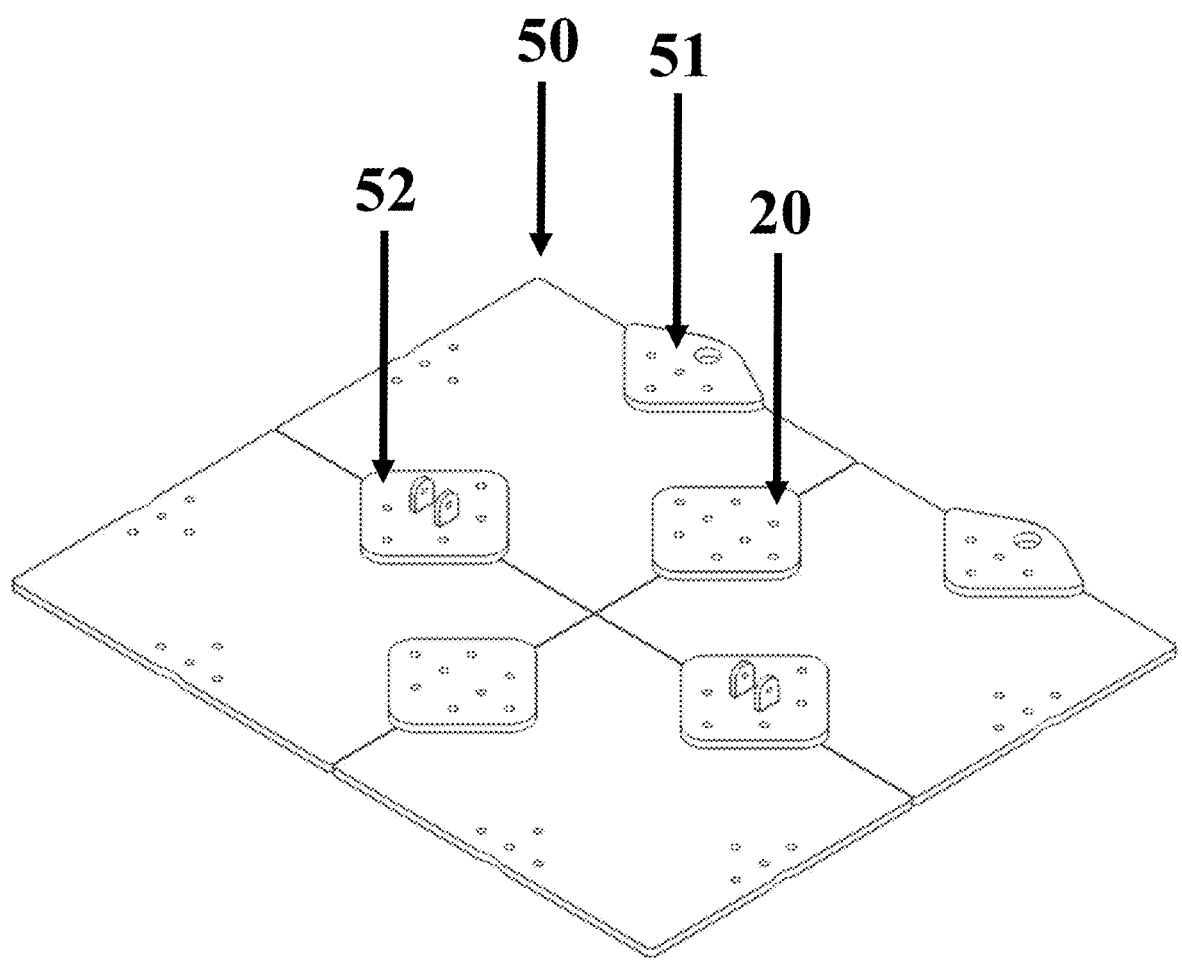
FIG. 5 depicts a small PSP panel assembly mosaic of the invention.

FIG. 2 depicts a preferred embodiment large bracket of the invention. The large bracket 20 is preferably aluminum and has holes that align with the integrated attachment points shown on FIG. 3. This bracket is a design much like FIG. 1 but has more attachment points, making the PSP panel assembly mosaic more secure. The bracket can be modified to other forms as depicted in FIG. 1, FIGS. 5 51 and 52. FIG. 5 shows 20 utilized to secure the mosaic together.

The citations provided herein are hereby incorporated by reference for the cited subject matter.

FIG. 3

FIG. 3 depicts a preferred embodiment of a PSP panel assembly. PSP panel assembly 30 is not limited only to this design depicted. FIG. 3 is merely a representation for better understanding further discussed in FIG. 4. The design depicted is 14 inches by 17 inches but could be any size relating to PSP panels.

Part Number 31 depicts a hole where the integrated attachment point would be integrated within the PC or other suitable material. This hole would accept the FIG. 6 melt-in threaded adapter to create a secure integrated attachment point. Other methods may be utilized to create an integrated attachment point. This depiction is to create a better understanding of the unique method taught herein.

Figure 4:
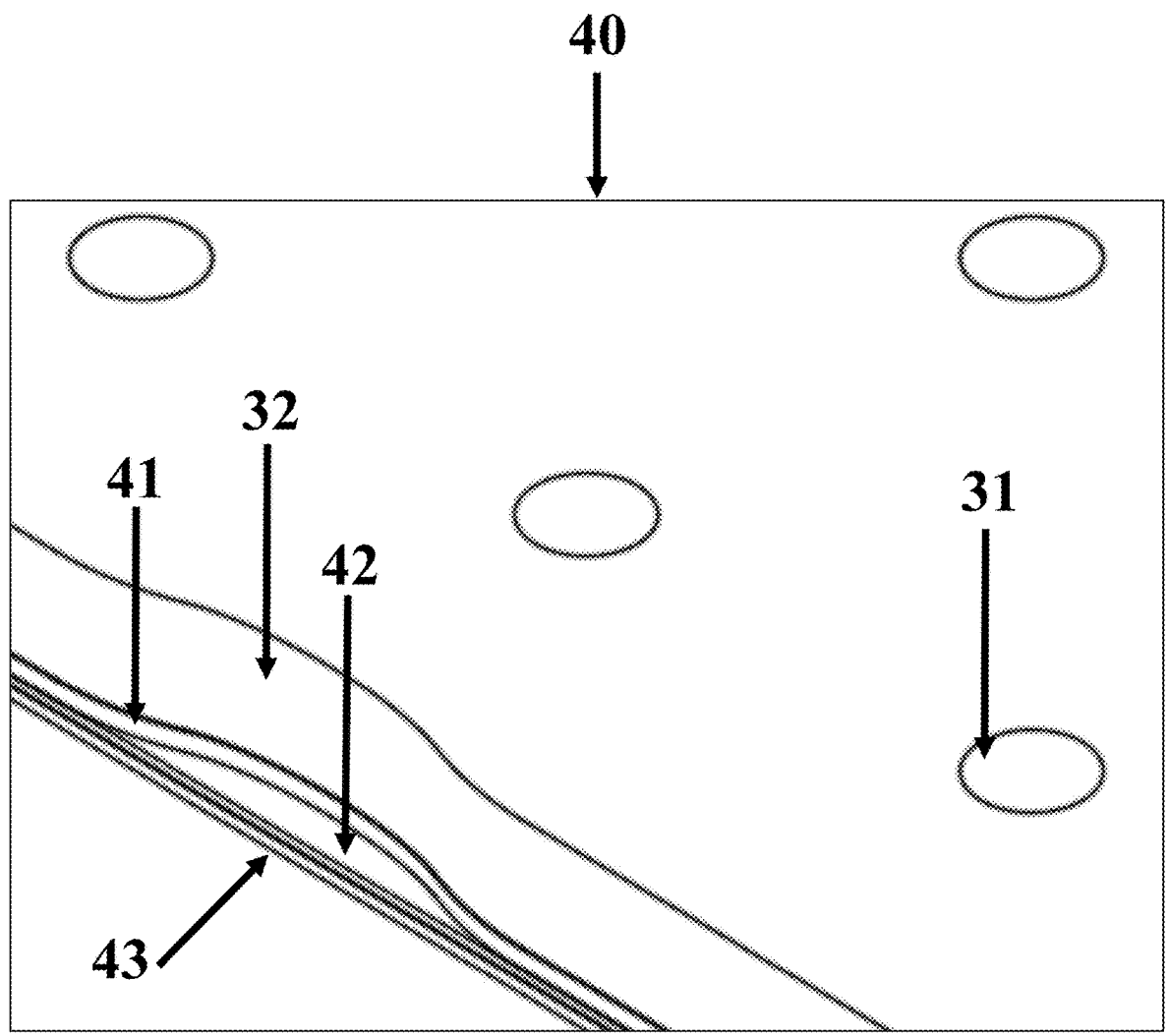
FIG. 4 depicts a preferred embodiment of a PSP panel assembly, zoomed in to show the different layers of material and features of the invention.

Part Number 32 depicts an optional ergonomic disassembly access hole, which makes the removal of 42 and 43 faster and more accessible. 32 is illustrated in further detail in FIG. 4.

The citations provided herein are hereby incorporated by reference for the cited subject matter.

FIG. 4

FIG. 4 depicts a preferred embodiment of a PSP panel assembly 40 zoomed in to show the different layers of materials and features.

Part Number 41 depicts a magnetic layer which is bonded to the layer above, with the same ergonomic disassembly access hole shown in 32.

Part Number 42 depicts a PSP panel typically used in computed radiography. The back of this panel is the side touching the magnet 41, which is not sensitive to light, allowing for it to be partially exposed for a finger access hole 32. The finger access holes 32 allows a user to separate 42 and 43 from the magnet 41 with ease.

Part Number 43 depicts an optional 30 mil layer of steel; the thickness and size may vary based on application. The steel 43 in this design serves two primary purposes acting as an intensifier for photon interaction, increasing efficiency and creating a bond to the magnet 41 securing the PSP plate 42 in place.

The citations provided herein are hereby incorporated by reference for the cited subject matter.

FIG. 5

FIG. 5 depicts a small PSP panel assembly mosaic 50 of the invention. The preferred embodiment shown has multiple forms of attachment brackets 52, 20 that could be utilized to secure the PSP panel assemblies together creating a mosaic. The attachments taught and depicted are not limited to these designs and may incorporate additional features like handles or D-ring attachment points as examples. FIG. 5 50 shows four 30 assemblies together connected by brackets taught herein utilizing the unique integrated attachment points.

Part Number 51 depicts an optional bracket design that would allow for the mosaic 50 to hang from high anchor points utilizing ropes and rigging equipment. This capability is another reason this design and method is ornate. Nothing currently allows for these types of attachments because the integrated attachment points make complex modular capabilities possible.

Part Number 52 depicts an optional bracket design that would utilize a cross pin to accept a pole acting much like a kickstand, securing the mosaic 50 in a standing position. A current method is using tape to prevent the mosaic 50 from falling once placed against an item. This method is dangerous because it typically involves taping the mosaic against a suspect package. Where this bracket 52 would allow for the mosaic 50 to stand on its own without the need for tape.

The citations provided herein are hereby incorporated by reference for the cited subject matter.

FIG. 6

Figure 6:
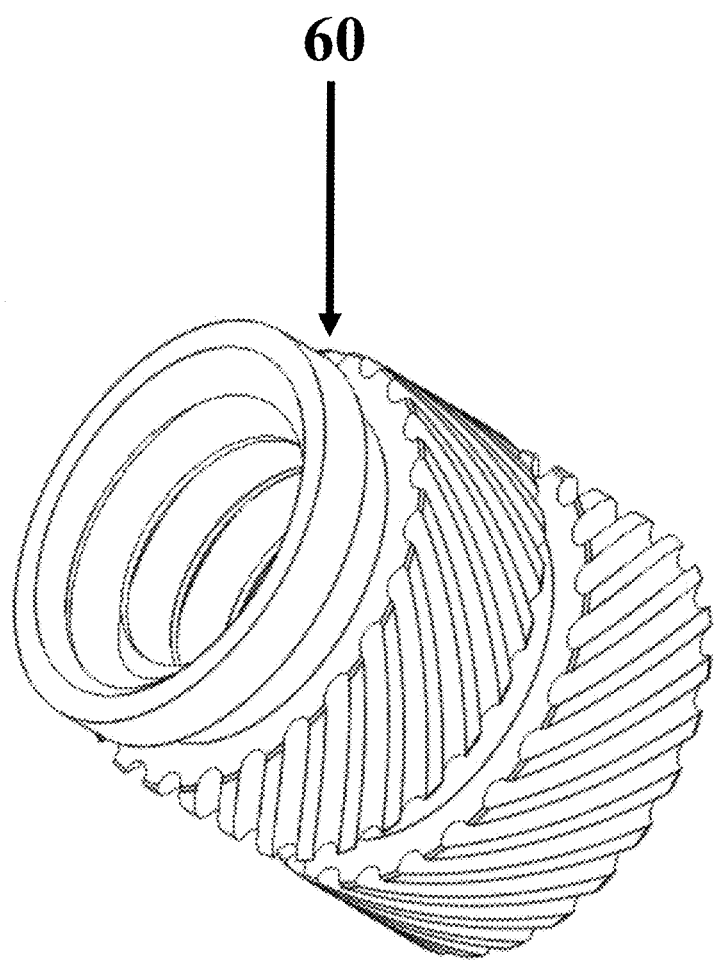
FIG. 6 an optional melt-in threaded adapter of the invention.

FIG. 6 depicts an optional melt-in threaded adapter 60 used as the integrated attachment point. Other methods are possible, as discussed herein. However, the preferred method is to use a threaded adapter like 60 to create a secure integrated attachment point in the PC or other suitable material, based on the overall design of the PSP panel assembly as discussed in FIG. 3 and FIG. 4.

The citations provided herein are hereby incorporated by reference for the cited subject matter.

What is claimed is:

1. A PSP panel assembly comprising of at least one integrated attachment point in which two or more panel assemblies may be attached and detached utilizing at least one bracket.

2. The PSP panel assembly of claim 1, wherein the PSP panel assembly may vary in size to accept commercially available PSP panels.

3. The bracket of claim 1, may be configured for added features to hoist or allowing the PSP panel mosaic to stand up independently.

4. An ergonomic disassembly access hole incorporated in a PSP panel assembly.

* * * * *